United States Patent
Banning et al.

(10) Patent No.: US 9,493,666 B2
(45) Date of Patent: *Nov. 15, 2016

(54) ENCAPSULATED VISIBLE LIGHT ABSORBING DYE POLYURETHANE DISPERSION

(71) Applicant: XEROX CORPORATION, Norwalk, CT (US)

(72) Inventors: Jeffery H. Banning, Cedar Rapids, IA (US); Kelley A. Moore, Salem, OR (US); Jian Yao, Portland, OR (US); Jesus Gonzalez, Jr., Salem, OR (US); Jule W. Thomas, Jr., West Linn, OR (US); Michael B Meinhardt, Lake Oswego, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,357

(22) Filed: Aug. 4, 2014

(65) Prior Publication Data
US 2016/0032123 A1    Feb. 4, 2016

(51) Int. Cl.
| | | |
|---|---|---|
| C09D 11/328 | (2014.01) |
| C09D 11/102 | (2014.01) |
| C09D 11/38 | (2014.01) |
| C08G 18/10 | (2006.01) |
| C08G 18/08 | (2006.01) |

(52) U.S. Cl.
CPC ........... *C09D 11/328* (2013.01); *C09D 11/102* (2013.01); *C09D 11/38* (2013.01); *C08G 18/0838* (2013.01); *C08G 18/10* (2013.01)

(58) Field of Classification Search
CPC ... C09D 11/328; C09D 11/38; C09D 11/102; C08G 18/10; C08G 18/0838

USPC .......... 523/201, 205, 206; 524/591
See application file for complete search history.

(56) References Cited

U.S. PATENT DOCUMENTS

| | | |
|---|---|---|
| 5,231,135 A | 7/1993 | Machell et al. |
| 5,621,022 A | 4/1997 | Jaeger et al. |
| 5,637,638 A | 6/1997 | Chandler et al. |
| 5,700,851 A | 12/1997 | Banning et al. |
| 6,221,137 B1 | 4/2001 | King et al. |
| 2006/0205869 A1 | 9/2006 | Steidl et al. |
| 2007/0060670 A1 | 3/2007 | Ellis |
| 2009/0169748 A1 | 7/2009 | House et al. |
| 2013/0196124 A1* | 8/2013 | Flores ............... C08G 18/0823 428/196 |
| 2014/0094559 A1* | 4/2014 | Lee et al. ...................... 524/548 |
| 2014/0249248 A1* | 9/2014 | Lee et al. ...................... 523/206 |
| 2014/0295152 A1* | 10/2014 | Brust et al. ................... 428/207 |

FOREIGN PATENT DOCUMENTS

WO    WO-2013/062601    *  5/2013  ............... C09C 3/10

OTHER PUBLICATIONS

Thomas, Adrian, "Polyurethane Dispersions and Polyurethane/Acrylic Hybrid Dispersions for Coating and Printing Applications", Surface Coatings Australia, Sep. 2008, pp. 16-24.

* cited by examiner

*Primary Examiner* — Michael L Leonard
(74) *Attorney, Agent, or Firm* — Pillsbury Winthrop Shaw Pittman LLP

(57) ABSTRACT

The present disclosure provides an encapsulated visible light absorbing dye dispersion, and the process for producing the same. The present disclosure further provides an inkjet ink comprising an ink vehicle and an encapsulated visible light absorbing dye dispersion thereof, and the process for producing the same.

18 Claims, 4 Drawing Sheets

ENCAPSULATED VISIBLE LIGHT ABSORBING DYE POLYURETHANE DISPERSION

CROSS-REFERENCE TO RELATED APPLICATIONS

Reference is made to commonly owned and co-pending, U.S. patent application Ser. No. 14/451,380 entitled "Encapsulated Flu1orescent and Photochromic Dye Polyurethane Dispersion" to Jeffrey Banning et al., electronically filed on the same day herewith; U.S. patent application Ser. No. 14/451,317 entitled "Encapsulated Titanium Dioxide, Fluorescent Pigments, and Pigmented Polyurethane Dispersion" to Jeffrey Banning et al., electronically filed on the same day herewith; U.S. patent application Ser. No. 14/451,408 entitled "Pigmented Polyurethane Dispersion" to Jeffrey Banning et al., electronically filed on the same day herewith; the entire disclosures of which are incorporated herein by reference in its entirety.

INTRODUCTION

Polyurethane dispersions have been employed as carriers in aqueous ink jet inks, for example, U.S. Pat. No. 5,700,851, and aqueous writing inks, for example, U.S. Pat. No. 5,637,638, which are entirely incorporated by reference herein. The dispersions described in these patents employed reactive polymeric colorants that are built into the polyurethane backbone of the molecule by covalent bonding, and act as the source of coloration of the final ink.

Visible light absorbing dyes are highly sought after for ink and coating applications.

However, encapsulating or incorporating visible light absorbing dyes the latex, in an emulsion polymerization, is not a trivial endeavor. This is because, during an emulsion polymerization, the visible light absorbing dye must satisfy the following requirements (1) be soluble in the monomers used in the emulsion polymerization, (2) be captured in a monomer micelle as polymerization takes place inside the micelle, and (3) be stable to the free radical polymerization environment. Many organic visble light absorbing dyes are not stable to such environments and their colors are subsequently destroyed. Typically, even if the encapsulated visble light absorbing dye survives the entire polymerization process, it is often not stable to the free radical environment at the end of the process when all the excess monomers are destroyed under oxidative or reductive conditions. The encapsulation of a visble light absorbing dye into a polyurethane dispersion circumvents all of these problems.

It is important that ink compositions comprising visible light absorbing dye dispersion remain stable, not only in storage but also over repeated jetting cycles. Therefore, a need exists for a method to encapsulate visible visible light absorbing dyes into the latex, and to provide a highly stable visible light absorbing dye polyurethane dispersion, which may be used for ink-jet applications.

SUMMARY OF THE INVENTION

Figure 1:
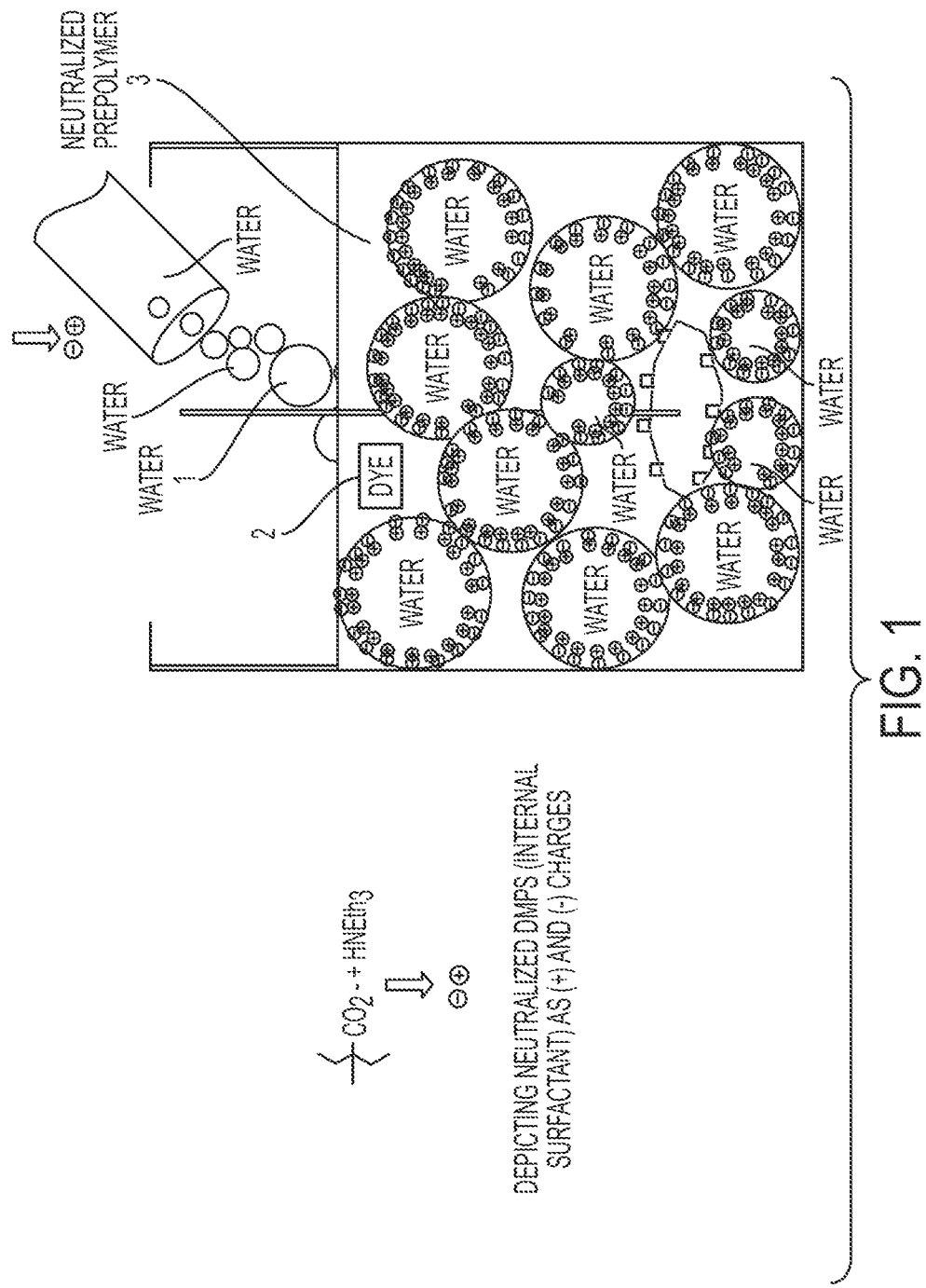
FIG. 1 shows a water-in-oil dispersion of a mixture of water and a neutralized prepolymer containing a visible light absorbing dye according to certain embodiments of the present disclosure.

The disclosure provides an encapsulated visible light absorbing dye dispersion comprising a polyurethane dispersion that is the reaction product of: (a) a urethane prepolymer, the urethane prepolymer being the catalyzed reaction product of: (i) a polyol; (ii) a polyisocyanate; and (iii) an internal surfactant; (b) a neutralizing agent; and (c) a chain extender; and a visible visible light absorbing dye, wherein the visible visible light absorbing dye is not reactive towards the polyisocyanate.

In further embodiments, the disclosure provides an encapsulated visible light absorbing dye dispersion comprising: a polyurethane dispersion that is the reaction product of: (a) a urethane prepolymer that is the catalyzed reaction product of: (i) a polyol; (ii) a polyisocyanate; and (iii) an internal surfactant; wherein the stoichiometric equivalent molar ratio of internal surfactant to polyol is from about 0.5 to about 2.0 and the stoichiometric equivalent molar ratio of NCO groups to total OH groups in the prepolymer is from about 1.2 to about 2.0; (b) a neutralizing agent; and (c) a chain extender; and an aqueous visible light absorbing dye dispersion comprising a visible visible light absorbing dye that is not reactive towards the polyisocyanate, wherein the visible visible light absorbing dye is not reactive towards the polyisocyanate, further wherein the encapsulated visible light absorbing dye dispersion has an average particle size of from about 20 nm to about 900 nm, a viscosity of from about 2 to about 150 cps at room temperature, and a surface tension of from about 15 to about 65 dyn at room temperature.

In embodiments, the disclosure also provides an ink jet ink composition comprising an encapsulated visible light absorbing dye dispersion comprising: a polyurethane dispersion that is the reaction product of: (a) a urethane prepolymer that is the catalyzed reaction product of: (i) a polyol; (ii) a polyisocyanate; and (iii) an internal surfactant; (b) a neutralizing agent; and (c) a chain extender; and a visible visible light absorbing dye, wherein the visible visible light absorbing dye is not reactive towards the polyisocyanate.

DETAILED DESCRIPTION

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "PUD"" means the polyurethanes dispersions described herein.

As used herein, the term "DMPA" means dimethylol propionic acid.

Disclosure provides an encapsulated visible light absorbing dye dispersion including a polyurethane dispersion and an aqueous visible light absorbing dye dispersion including a visible visible light absorbing dye that is unreactive towards any reagent/or precursor of the urethane prepolymer (i.e., the polyol, the polyisocyanate, and/or the internal surfactant). The polyurethane dispersion of the disclosure is a reaction product of (a) a urethane prepolymer, (b) a neutralizing agent, and (c) a chain extender, where the urethane prepolymer is prepared from (i) a polyol, (ii) a polyisocyanate, and (iii) an internal surfactant.

When preparing the encapsulated visible light absorbing dye dispersion of the present disclosure, a visible light absorbing dye may be incorporated, or encapsulated, into the polyurethane dispersion by adding/dissolving the visible light absorbing dye to the pre-polymer just before water is added during the formation of the polyurethane dispersion, hence, prior to the addition of a chain extender.

The preparation of encapsulated visible light absorbing dye dispersion requires a viscous prepolymer being first formed, and then the visible light absorbing dye being added after the pre-polymer has been formed. The visible light absorbing dyes of the disclosure are immiscible in water. Therefore, if such dyes are added to the polyurethanes dispersions after they have been made, the dyes would simply "float" in the water portion of the latex. In the present disclosure, the dyes are added to the prepolymer or the components that are reacted to make the prepolymer (i.e., polyisocyanate, polyol & internal surfactant), as the dyes are soluble in these organics.

In certain embodiments, the encapsulated visible light absorbing dye dispersion may be prepared by a process including preparing a urethane prepolymer, dissolving a visible light abosorbing dye into this prepolymer; reacting the urethane prepolymer with a neutralizing agent; adding water to the neutralized prepolymer to form an aqueous dispersion of the neutralized prepolymer; and reacting the aqueous dispersion of the neutralized prepolymer with a chain extender thereby producing an encapsulated visible light absorbing dye dispersion, wherein the step of preparing a urethane prepolymer include adding a visible visible light absorbing dye to the reaction mixture. For example, the visible light absorbing visible light absorbing dye may be added to the mixture of polyol, polyisocyanate, and internal surfactant in the presence of a catalyst.

In certain embodiments, the encapsulated visible light absorbing dye dispersion may be prepared by a process including preparing a urethane prepolymer; adding/dissolving a visible light absorbing dye to the urethane prepolymer; reacting the urethane prepolymer with a neutralizing agent to form a neutralized prepolymer; adding water to the neutralized prepolymer to form an aqueous dispersion of the neutralized prepolymer; and reacting the aqueous dispersion of the neutralized prepolymer with a chain extender thereby producing an encapsulated visible light absorbing dye dispersion.

In certain embodiments, the encapsulated visible light absorbing dye dispersion may be prepared by a process including preparing a urethane prepolymer; reacting the urethane prepolymer with a neutralizing agent to form a neutralized prepolymer; adding a visible light absorbing dye to the neutralized prepolymer; adding water to the neutralized prepolymer to form an aqueous dispersion of the neutralized prepolymer; and reacting the aqueous dispersion of the neutralized prepolymer with a chain extender thereby producing an encapsulated visible light absorbing dye dispersion.

The urethane prepolymer can be prepared by reacting a polyol, a polyisocyanate, and an internal surfactant in the presence of a catalyst. The internal surfactant may be dissolved in an organic solvent, such as NMP, DMF, or other polar aprotic solvents, prior to the addition to the polyol and polyisocyante.

Generally, the stoichiometric equivalent molar ratio of internal surfactant to polyol may be from about 0.5 to 2, from 0.75 to 1.75, or from about 1 to about 1.5, the stoichiometric equivalent molar ratio of NCO groups to total OH groups in the prepolymer may be from about 1.0-3.0, from about 1.25 to 2.5, or form about 1.5 to about 2.0. It is desired to have a high internal surfactant to polyol ratio and a low NCO group to OH group ratio. Typically, the urethane prepolymer reaction is carried out at about 70° C. to about 100° C. for about 1 to about 5 hours until the theoretical isocyanate content, which can be determined by, e.g., the di-n-butylamine titration method, is reached to form an urethane prepolymer (isocyanate-terminated) containing an internal surfactant therein.

The urethane prepolymer (isocyanate terminated prepolymer containing an internal surfactant therein) can be neutralized with a neutralizing agent, such as a trialkylamine, e.g., triethylamine. The amount of neutralizing agent used may be dependent upon the amount of internal surfactant present in the urethane prepolymer, and ranges from about 5% to about 100%, from about 10% to about 90% or from about 20% to about 70% of the quantity of internal surfactant. This neutralization step allows the urethane prepolymer to be dispersible by neutralizing the functional groups of the urethane prepolymer. In one embodiment, the carboxylic acid sites on the internal surfactants may be neutralized thereby forming a salt, such as $-CO_2^-HN^+R_3$, where R is a lower alkyl group.

Figure 2:
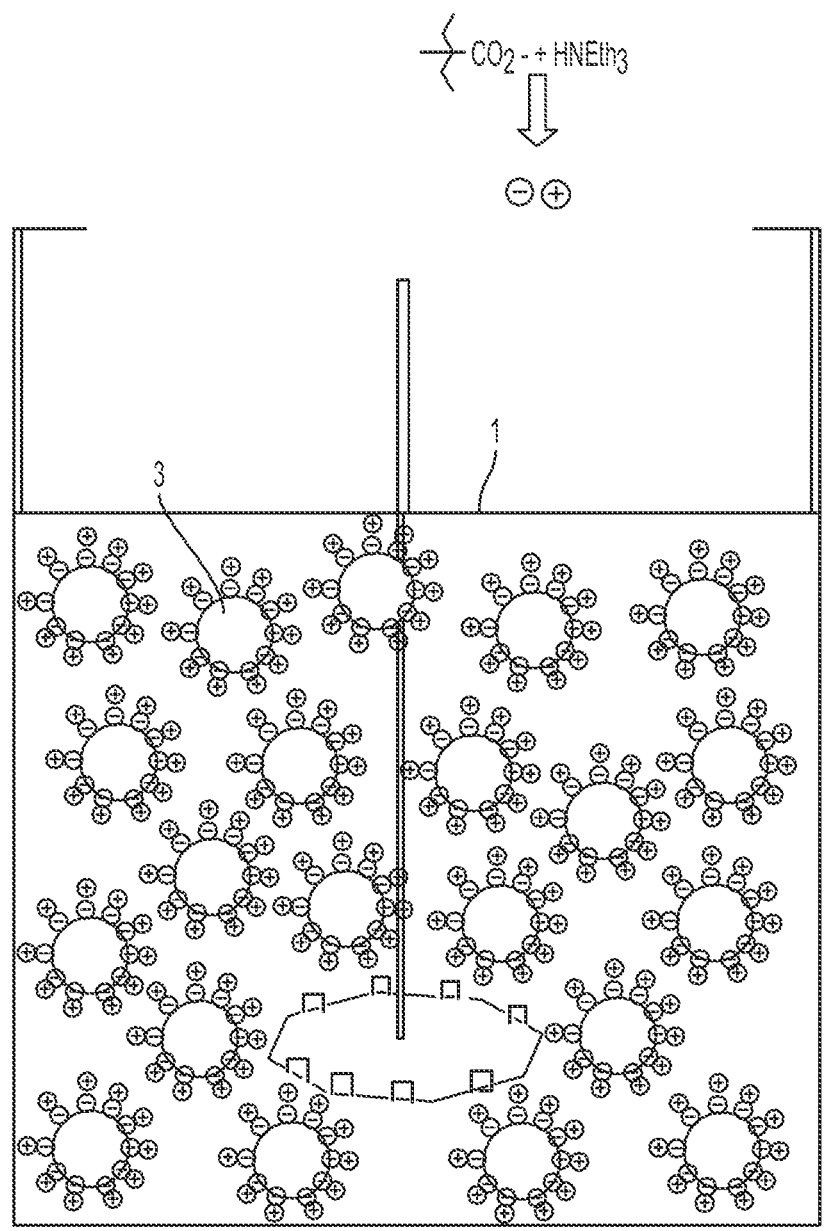
FIG. 2 shows an oil-in-aqueous dispersion of a mixture of water and a neutralized prepolymer containing a visible light absorbing dye after high speed spinning according to certain embodiments of the present disclosure.
Figure 3:
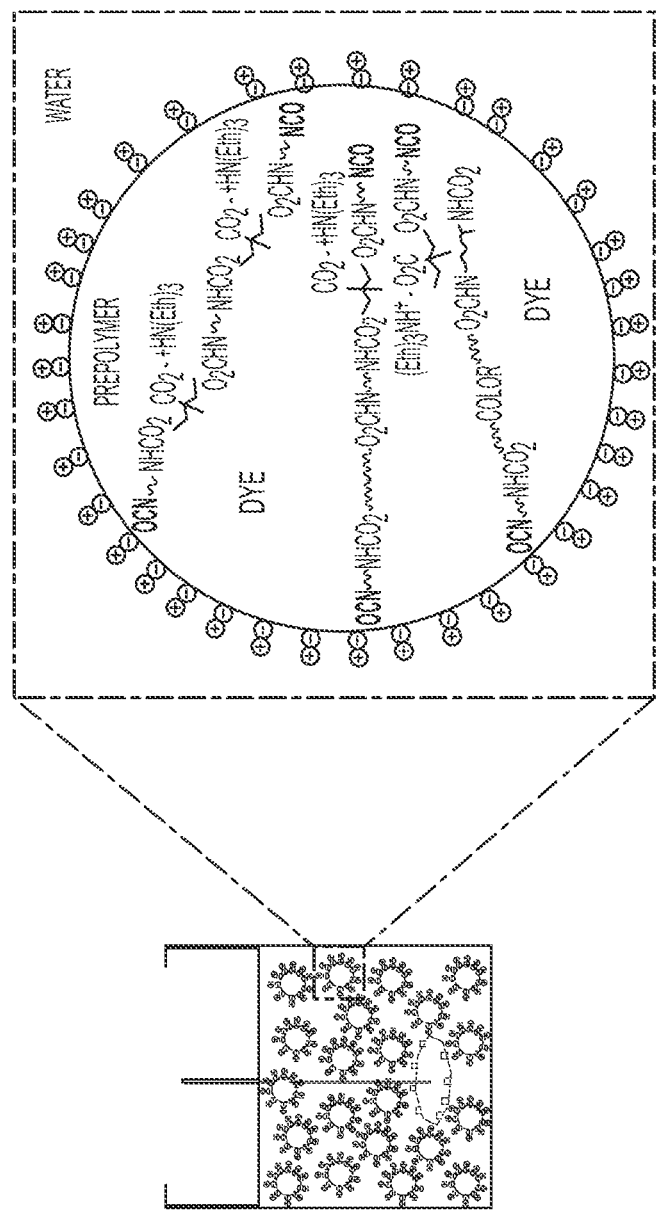
FIG. 3 shows a close up view of a single visible light absorbing dye dispersion particle in water according to certain embodiments of the present disclosure.

The neutralized prepolymer, typically, has an average weight molecular weight (MW) of from about 1,000 to about 20,000, from about 3,000 to about 15,000, or from about 5,000 to about 10,000. Water 1, e.g., deionized (DI) water, can be added to the neutralized prepolymer 3 which contains visible light absorbing dye 2 which can be added during the formation of the prepolymer or after the formation of the prepolymer but prior to the addition of the neutralizing agent. The amount of water in the aqueous dispersion is based on the desired percentage of solids in the final polyurethane dispersion, which may be in amount of from about 1.0 to about 99 percent, from about 20 to about 80 or from about 35 to about 60 percent based on the total weight of the aqueous dispersion. The aqueous dispersion usually starts out as a "water-in-oil" dispersion the moment the water is added under dispersion conditions. FIG. 1 shows a "water-in-oil" dispersion when water is first added to the neutralized prepolymer. During the dispersion process, the mixture (i.e., water and the neutralized prepolymer 3) may be spinned at high speed (e.g., 5,000-10,000 rpms) and the "water-in-oil" dispersion may be converted to an "oil-in-water" dispersion. The dispersion can be accomplished by spinning a blade, such as a dispersion blade 4. The effect of employing a dispersion blade at high speed imparts energy into the system to disperse rather than to mix. At this point, the particle size of the final encapsulated visible light absorbing dye dispersion may be determined. FIG. 2 shows an "oil-in-water" dispersion, where the neutalized prepolymer 3 is suspended in the water. Inside a droplet of the neutalized prepolymer 3, the terminals (i.e., free —NCO groups) of the neutralized prepolymer are at the inside surface of the droplet. In one embodiment of the disclosure, FIG. 3 shows a close up view of a single dispersion particle in water, where DMPA is employed as the the internal surfactant.

Figure 4:
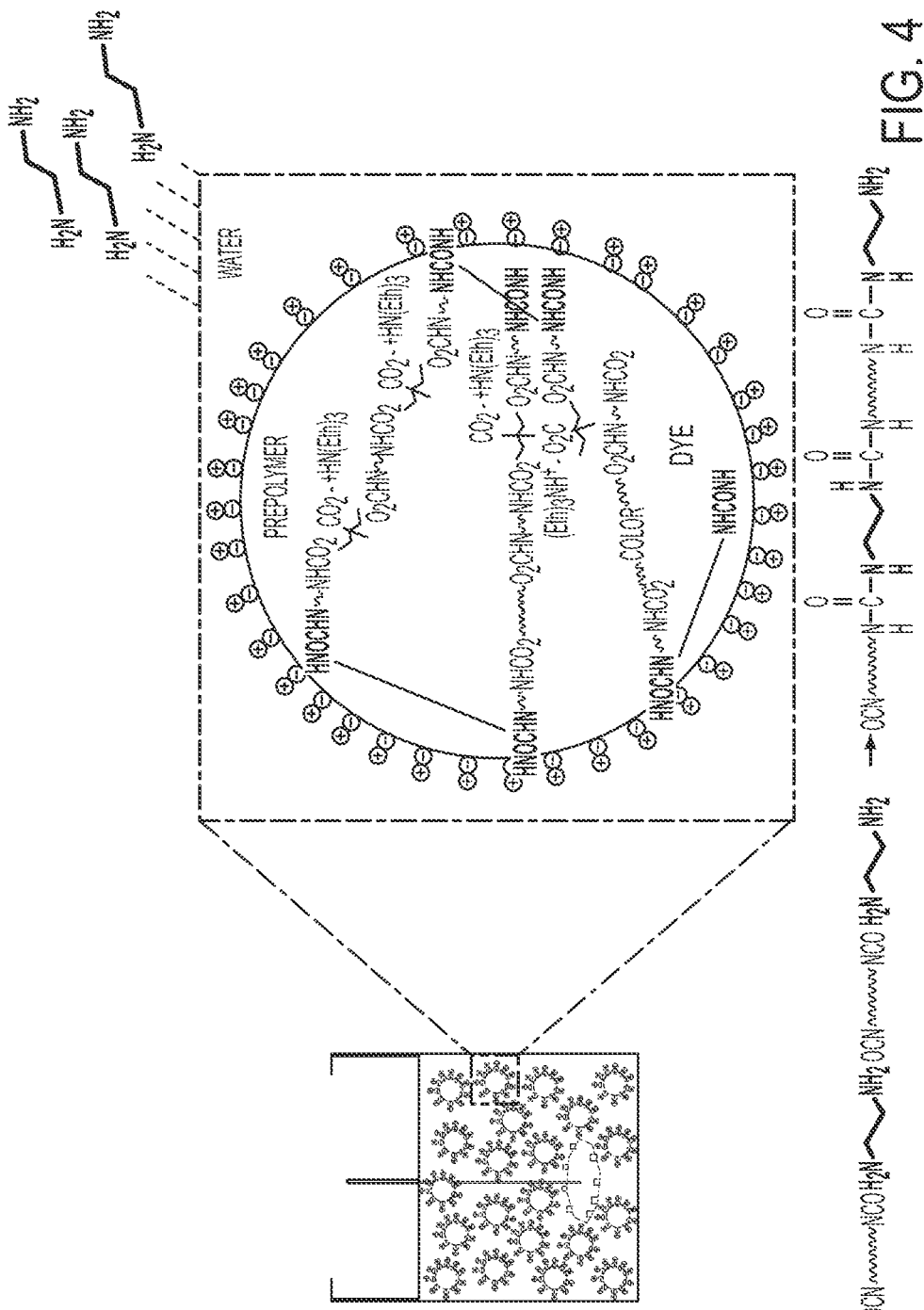
FIG. 4 shows a close up view of a single visible light absorbing dye dispersion particle after the addition of a chain extender dispersion according to certain embodiments of the present disclosure.

A chain extender such as a suitable diamine, triamine, diol or a triol, may be then added to increase the average weight molecular weight of the polyurethane dispersion by using an amount stoichiometrically equivalent to from about 60 to about 100 percent of the amount of prepolymer, or from about 85 to about 95 percent of the amount of the prepolymer. The average weight molecular weight of the polyol employed and the particular chain extender used can impact the adhesion of the ink to the final receiving substrate. The chain extender may diffuse or migrate into the particles of the dispersion and react with the terminated free isocyanate groups of the neutralized prepolymer, and thus extend the molecular weight of the polyurenthane polymer and form ureas in the process. In one embodiment of the disclosure, FIG. 4 shows a close up view of a single dispersion particle after the addition of a chain extender, e.g., ethylene diamine in water, where DMPA is employed as the the internal surfactant.

Examples of the chain extender suitable for use in the present disclosure include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; diamines containing one primary amino group and one secondary amino group such as N-hydroxymethylaminoethylamine, N-hydroxyethylaminoethylamine, N-hydroxypropylaminopropylamine, N-ethylaminoethylamine, and N-methylaminopropylamine; polyamines such as diethylenetriamine, dipropylenetriamine, and triethylenetetramine. In one embodiment, the chain extender includes ethylene diamine.

Any suitable amounts of prepolymer, neutralizing agent, water and chain extender may be added to the urethane prepolymer as long as a stable polyurethane dispersion is formed.

As a stirring/dispersing device for dispersing pigments, for example, various known dispensers such as a high speed impeller disc, an ultrasonic homogenizer, a high-pressure homogenizer, a paint shaker, a ball mill, a roll mill, a sand mill, a sand grinder, a dyno mill, dispermat, an SC mill, a nanomizer, or the like can be used.

The encapsulated visible light absorbing dye polyurethane dispersion is then combined with an aqueous medium, at least one humectant, and optionally at least one plasticizer.

The encapsulated visible light absorbing dye dispersion of the present disclosure may have an average dispersion particle size (i.e., particle diameter) of from about 20 nm to about 900 nm, from about 30 nm to about 600 nm, or from about 50 nm to about 100 nm. This size range permits the particles and the resultant ink in which they are dispersed to overcome settling and stability/dispersing problems. The average particle diameter can be measured by various methods, for example, they can be measured using a particle analyzer UPA 150 manufactured by Nikkiso Co., Ltd.

The encapsulated visible light absorbing dye dispersion of the present disclosure may have a viscosity of from about 2 to about 150 cps, from about 10 to about 100 cps, or from about 20 to about 80 cps at room temperature. The encapsulated visible light absorbing dye dispersion of the present disclosure may have a surface tension of from about 15 to about 65 dyn, from about 25 to about 60 dyn, or from about 35 to about 55 dynes, at room temperature.

The visible light absorbing dye content of the encapsulated visible light absorbing dye dispersion of the present disclosure may be in the range of from about 0.1 to about 30 percent, from about 1.0 to about 15 percent, or from about 2.0 to about 5.0 percent by weight of the encapsulated visible light absorbing dye dispersion.

The visible light absorbing dyes of the present disclosure are unreactive towards any reagent/or precursor of the urethane prepolymer (i.e., the polyol, the polyisocyanate, and the internal surfactant). Particularly, the pigments do not contain any non-phenolic hydroxyl group nor aliphatic primary or secondary amines, but may include a phenolic hydroxyl group and/or a tertary amine in which one of the three substituents is an aromatic ring.

The visible light absorbing dyes used in the present disclosure may have a maximum absorphtion wavelength in a range of about 400 to about 700 nm. examples of visible visible light absorbing dyes include Color Index (CI) Solvent Visible light absorbing dyes, Disperse Visible light absorbing dyes, modified Acid and Direct Visible light absorbing dyes, Basic Visible light absorbing dyes, Sulphur Visible light absorbing dyes, Vat Visible light absorbing dyes, and the like. Examples of suitable visible light absorbing dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (CI Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Typical dyes, classified in the Color Index under the title "Disperse Dyes," generally belong to groups comprising azo, anthraquinone, phthalocyanine, indophenol, indoaniline, perinone, quinophthalone, acridine, xanthone, diazine, and oxazine dyes.

Specific examples of visible light absorbing dyes include Solvent Blue 25, Solvent Yellow 43, Disperse Blue 359, Disperse Yellow 54, Disperse Red 60.

As used herein, the term "polyol" is intended to include materials that contain two or more hydroxyl groups, e.g., diol, triol, tetraol, etc. The average weight molecular weight of the polyol may be in the range of from about 60 to about ×10,000×, from about ×500× to about 5000, or from about ×1000× to about ×2000×. Non-limiting examples of polyols include diols, triols, polyether polyols, polyacrylate polyols, polyester polyols, polycarbonate polyols, and combinations thereof. Suitable polyether polyol include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Suitable polyacrylate polyols include, but are not limited to, glycerol 1,3-diglycerolate diacrylate Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. Suitable polycarbonate polyols include, but are not limited to, poly(polyTHFcarbonate)diol.

As used herein, the term "polyisocyanate" is intended to include materials that contain two or more isocyanate groups. The average weight molecular weight of the polyisocyanate may be in the range of from about 140 to about 1000, from about 168 to about 262, or from about 222 to about 680. Suitable polyisocyanates include diisocyanates, triisocyanates, copolymers of a diisocyanate, copolymers of a triisocyanate, polyisocyanates (having more than three isocyanate functional groups), and the like, as well as mixtures thereof. Examples of diisocyanates include isophorone diisocyanate (IPDI); toluene diis ocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Suitable internal surfactants include both anionic and cationic internal surfactants. These include sulfonate diamines and diols, and dihydroxy carboxylic acids. In one embodiment, the internal surfactant is α,α-dimethylolpropionic acid (DMPA).

Any conventional urethane forming catalyst can be used in the prepolymer-forming reaction. Suitable urethane reaction catalyst, include, but are not limited to, dibutyl tindilaurate, bismuth tris-neodecanoate, cobalt benzoate, lithium acetate, stannous octoate, triethylamine, or the like.

The encapsulated visible light absorbing dye dispersions of the present disclosure may be used in inkjet inks. The inkjet inks of the present invention can be prepared by diluting the encapsulated visible light absorbing dye dispersion of the present invention with water or an aqueous solvent that contains water, and adding thereto other optional additives, e.g., humectant, plasticizier, contuctibity agents, defoamers, anti-oxidants, corrosion inhibitors, bacteriocides, pH control agents, if necessary.

The ink jet ink compositions may include a humectant. Examples of humectants include, but are not limited to, alcohols, for example, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and monoalcohols such as n-propanol and iso-propanol. The humectant may be present in an amount from about 2% to about 20%, or from about 4% to about 10% by weight of the ink composition.

The ink jet ink compositions may include a plasticizer. Examples of plasticizers include, but are not limited to, aliphatic polyols, phthalate esters (such as 1,6-hexane diol and dioctylphthalate), and other urethane compatible plasticizers.

The ink jet ink compositions may also include other components to impart characteristics desirable for ink jet printing applications. These optional components include conductivity agents, defoamers, anti-oxidants and corrosion inhibitors which improve ink manufacturing and printer performance; bacteriocides, which prevent bacterial attack that fouls ink manufacturing equipment and printers; and pH control agents, which insure that the components of the ink composition remain soluble throughout the operable range of water contents as well as throughout the period of storage and use.

The ink jet ink compositions of the present disclosure have a high degree of transparency and brightness. The inks of the present disclosure may have a surface tension in the range of about 20 dynes/cm to about 70 dynes/cm, or in the range 30 dynes/cm to about 50 dynes/cm; a viscosity in the range of about 1.0 to about 10.0, or about 1.0 to about 5.0 centipoise at room temperature.

The encapsulated visible light absorbing dye dispersion particles remain stabilized or dispersed in a liquid carrying medium in the ink having a pH of from about 4 to about 10, from about 5 to about 9, or from about 6 to about 8.

EXAMPLES

The following Examples further illustrate the present invention. All parts and percentages are by weight and all temperatures are degrees Celsius unless explicitly stated otherwise.

Example 1

Preparation of Neutralized Dyed Pre-Polymer

Pre-Dissolved DMPA/NMP Solution:
Into a 50 ml flask equipped with a Teflon coated stir magnetic was added 9.75 g of 2,2-bis(hydroxymethyl) propionic acid (DMPA, MW=134, available from Adrich Chemical of Milwaukee, Wis.) and 15.6 g of N-methylpyrrolidone (NMP). The mixture was heated at 70° C. with stifling until the DMPA was completely dissolved.

Pre-Polymer Formation:
Into a 1 L kettle equipped with a Trubore stirrer and Teflon stir paddle, temperature controller, 100 mL constant pressure addition funnel and $N_2$ inlet was charged 72.76 g pre-melted Terathane® 2000 (average Mn=2000 poly(tetrahydrofuran), available from Simga-Aldrich). The kettle was secured in a bracket and the bottom ⅓ of the kettle was submerged in a 70° C. oil bath, and the contents were stirred for 15 minutes.

The pre-dissolved DMPA/NMP solution was added to the kettle. After the contents were stirred for about 15 minutes, 42.4 g of isopherone diisocyanate (IPDI, MW=222, available from Huls America, Inc. of Piscataway, N.J.) was added to the kettle drop-wise through an addition funnel over about 30 minutes. A slight exotherm was observed. The reaction mixture was continued to be heated at 70° C. with stirring for about 3 hours and 45 minutes.

Example 2

Neutralization and Incorporation of Visible Light Absorbing dye in Polyurethane Dispersion:

The resulting mixture was added a) 0.5 g of Solvent Blue 25 in 5 g of NMP, b) 2 g of Solvent Yellow 43 [a cyan dye], c) 2 g Disperse Blue 359 [a cyan colored copper phthalocyanine dye], d) 1 g Disperse Yellow 54, or e) 2 g Disperse Red 60 [a red-magenta dye], and stirred for several minutes, followed by addition of about 7.35 g of triethylamine (MW=101) with continuous stirring and heating at 70° C. After stirring and heating for about 15 minutes the neutralized pre-polymer was ready to be dispersion. The kettle containing the neutralized pre-polymer was transferred to the dispersing apparatus with the dispersion blade about 0.25 inch below the surface of the neutralized pre-polymer.

To the neutralized visible light absorbing dyed pre-polymers obtained above were each added 245 mL of chilled (~5° C.) deionized water. The resulting mixtures were dispersed at the highest speed (approximately 7,500 rpms) with an IKA® Crushing Disperser for about 15 seconds. A long wood tongue depressor was employed to scrape off the un-dispersed pre-polymer stucked on the wall of the kettle. The un-dispersed pre-polymer was placed onto the bottom of the blade of the IKA® Crushing Disperser and dispersed again for about 10 seconds at the highest rpm setting. Aqueous visible light absorbing dye containing dispersions of the neutralized propolymer were obtained.

Example 3

Chain Extension

To the aqueous visible light absorbing dye dispersion of the neutralized propolymers obtained in Example 2 was each added dropwise an ethylene diamine solution (4.9 g ethylene diamine/10 g distilled water) over about 5 minutes. After stifling for about 1 hour, the resulting mixture was transferred to a 32 oz glass jar, capped and stored for at least 72 hours. At the end of the 72 hours, five different encapsulated visible light absorbing dye dispersions were obtained.

Example 4

Analysis and Measurments

Approximately 20 g of each of the encapsulated visible light absorbing dye PU-dispersions obtained in Example 3 was poured into a 100 mm×10 cm petri dish top or bottom and allowed to dry/coalesce over a 48 hour period. The samples were pealed out of the Petri dish yielding a colored urethane disc/film. The color of the urethane disc is described in Table 1.

TABLE 1

| Visible light absorbing dye | Appearance of Polyurethane Films of Example 4 |
|---|---|
| a) Solvent Blue 25 | Cyan colored |
| b) Solvent Yellow 43 | Yellow colored |
| c) Disperse Blue 359 | Cyan colored. Some solids settled over time which appeared to be un-encapsulated visible light absorbing dye. |
| d) Disperse Yellow 54 | Yellow colored. Some solids settled over time which appeared to be un-encapsulated visible light absorbing dye. |
| e) Disperse Red 60 | Red colored. Some solids settled over time which appeared to be un-encapsulated visible light absorbing dye. |

The viscosity (cps) and surface tension of the encapsulated pigment dispersion containing a) Solvent Blue 25 at various concentrations obtained from Example 3 were measured and the data are shown in Table 2.

TABLE 2

| CYAN-PUD | PUD/water ratio | | | |
|---|---|---|---|---|
|  | 100 | 75/25 | 50/50 | 25/75 |
| Viscosity at room temperature (cps) | 28.83 | 6.25 | 2.92 | 1.78 |
| Surface tension (dyn/cm) at room temperature | 44.05 | | | |

Example 5

Preparation of Aqueous Ink-Jet Inks

Into three separate 2-oz jars was each charged 10 g of a different encapsulated visible light absorbing dye dispersion obtained from Example 4, and 2 g of 0.1M pH8 $K_2HPO_4$/$KH_2PO_4$ buffer and 8 g DI water. The contents were stirred for about 2 minutes.

The resulting inks were loaded onto three separate empty ink cartridges, and were printed out on an EPSON WF-3540 printer. Xerox 4200 paper was used.

What is claimed is:
1. An encapsulated visible light absorbing dye dispersion consisting essentially of:
   a polyurethane dispersion that is the reaction product of:
      (a) a urethane prepolymer having an average weight molecular weight of from about 1,000 to about 20,000, the urethane prepolymer being the catalyzed reaction product of:
         (i) a polyol;
         (ii) a polyisocyanate; and
         (iii) an internal surfactant;
      (b) a neutralizing agent; and
      (c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'dicyclohexylmethanediamine, N-hydroxymethylaminoethylamine, N-hydroxyethylaminoethylamine, N-hydroxypropylaminopropylamine, N-ethylaminoethylamine, diethylenetriamine, dipropylenetriamine, and triethylenetetramine and N-methylaminopropylamine, ethylene diamine, and combinations thereof; and a visible light absorbing dye, wherein the visible light absorbing dye is not reactive towards the polyisocyanate;
wherein the encapsulated visible light absorbing dye dispersion is obtained by a process comprising:
providing the urethane prepolymer;
reacting the urethane prepolymer with a neutralizing agent to form a neutralized prepolymer;
adding the visible light absorbing dye to the neutralized prepolymer;
adding water to the neutralized prepolymer to form an aqueous dispersion of the neutralized prepolymer; and
reacting the aqueous dispersion of the neutralized prepolymer with a chain extender thereby producing an encapsulated visible light absorbing dye dispersion.

2. The encapsulated visible light absorbing dye dispersion of claim 1 having an average dispersion particle size of from about 20 nm to about 900 nm.

3. The encapsulated visible light absorbing dye dispersion of claim 1 having a viscosity of from about 2 to about 150 cps at room temperature.

4. The encapsulated visible light absorbing dye dispersion of claim 1, wherein the stoichiometric equivalent molar ratio of internal surfactant to polyol is from about 0.5 to about 2.0 and the stoichiometric equivalent molar ratio of NCO groups to total OH groups in the prepolymer is from about 1.2 to about 2.0.

5. The encapsulated visible light absorbing dye dispersion of claim 1, wherein the visible light absorbing dye is present in the amount of from about 0.1 to about 30 percent by weight of the encapsulated visible light absorbing dye dispersion.

6. The encapsulated visible light absorbing dye dispersion of claim 1, wherein the visible light absorbing dye has an average visible light absorbing dye particle size of from about 20 nm to about 900 nm.

7. The encapsulated visible light absorbing dye dispersion of claim 1, wherein the polyol is selected from the group consisting of polyether polyols, polyester polyols, polycarbonate polyols, silicone-based polyols and combinations thereof.

8. The encapsulated visible light absorbing dye dispersion of claim 1, wherein the polyisocyanate is selected from the group consisting of aliphatic, cycloaliphatic, aromatic and heterocyclic polyisocyanates and combinations thereof.

9. The encapsulated visible light absorbing dye dispersion of claim 1, wherein the internal surfactant is selected from the group consisting of anionic internal surfactants, cationic internal surfactants and combinations thereof.

10. The encapsulated dye dispersion of claim 1, wherein the internal surfactant comprises dimethylopropionic acid.

11. The encapsulated visible light absorbing dye dispersion of claim 1, wherein the neutralizing agent comprises trialkylamine.

12. The encapsulated visible light absorbing dye dispersion of claim 1, wherein the encapsulated visible light absorbing dye dispersion is obtained by the process comprises:
preparing a urethane prepolymer;
reacting the urethane prepolymer with a neutralizing agent;
adding an aqueous dispersion to the neutralized prepolymer to form an aqueous dispersion of the neutralized prepolymer; and
reacting the aqueous dispersion of the neutralized prepolymer with a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'dicyclohexylmethanediamine, N-hydroxymethylaminoethylamine, N-hydroxyethylaminoethylamine, N-hydroxypropylaminopropylamine, N-ethylaminoethylamine, diethylenetriamine, dipropylenetriamine, and triethylenetetramine and N-methylaminopropylamine, ethylene diamine, and combination thereof, thereby producing an encapsulated visible light absorbing dye dispersion;
wherein the process further includes a step of adding a visible light absorbing dye which occurs prior to reacting the aqueous dispersion of the neutralized prepolymer with a chain extender, wherein the visible light absorbing dye is not reactive towards the polyisocyanate.

13. The encapsulated visible light absorbing dye dispersion of claim 1, wherein a step of adding a visible light absorbing dye occurs during the step of preparing a urethane prepolymer.

14. The encapsulated visible light absorbing dye dispersion of claim 1, wherein a step of adding a visible light absorbing dye occurs after reacting the urethane prepolymer with a neutralizing agent and before adding an aqueous dispersion to the neutralized prepolymer.

15. The encapsulated visible light absorbing dye dispersion of claim 1, wherein a step of adding a visible light absorbing dye occurs after adding an aqueous dispersion to the neutralized prepolymer to form an aqueous dispersion of the neutralized prepolymer and before reacting the aqueous dispersion of the neutralized prepolymer with a chain extender.

16. An encapsulated visible light absorbing dye dispersion consisting essentially of:
a polyurethane dispersion that is the reaction product of:
(a) a urethane prepolymer having an average weight molecular weight of from about 1,000 to about 20,000 that is the catalyzed reaction product of:
(i) a polyol;
(ii) a polyisocyanate; and
(iii) an internal surfactant;
wherein the stoichiometric equivalent molar ratio of internal surfactant to polyol is from about 0.5 to about 2.0 and the stoichiometric equivalent molar ratio of NCO groups to total OH groups in the prepolymer is from about 1.2 to about 2.0;
(b) a neutralizing agent; and
(c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'dicyclohexylmethanediamine, N-hydroxymethylaminoethylamine, N-hydroxyethylaminoethylamine, N-hydroxypropylaminopropylamine, N-ethylaminoethylamine, diethylenetriamine, dipropylenetriamine, and triethylenetetramine and N-methylaminopropylamine, ethylene diamine, and combinations thereof; and
an aqueous visible light absorbing dye dispersion comprising a visible light absorbing dye that is not reactive towards the polyisocyanate, wherein the visible light absorbing dye is not reactive towards the polyisocyanate;
further wherein the encapsulated visible light absorbing dye dispersion has an average particle size of from about 20 nm to about 900 nm, a viscosity of from about 2 to about 150 cps at room temperature, and a surface tension of from about 15 to about 65 dyn at room temperature;

wherein the encapsulated visible light absorbing dye dispersion is obtained by a process comprising:

providing the urethane prepolymer;

reacting the urethane prepolymer with a neutralizing agent to form a neutralized prepolymer;

adding the visible light absorbing dye to the neutralized prepolymer;

adding water to the neutralized prepolymer to form an aqueous dispersion of the neutralized prepolymer; and reacting the aqueous dispersion of the neutralized prepolymer with a chain extender thereby producing an encapsulated visible light absorbing dye dispersion.

17. An ink jet ink composition comprising an encapsulated visible light absorbing dye dispersion consisting essentially of:

a polyurethane dispersion that is the reaction product of:
(a) a urethane prepolymer having an average weight molecular weight of from about 1,000 to about 20,000 that is the catalyzed reaction product of:
(i) a polyol;
(ii) a polyisocyanate; and
(iii) an internal surfactant;
(b) a neutralizing agent; and
(c) a chain extender selected from the group consisting of ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'dicyclohexylmethanediamine, N-hydroxymethylaminoethylamine, N-hydroxyethylaminoethylamine, N-hydroxypropylaminopropylamine, N-ethylaminoethylamine, diethylenetriamine, dipropylenetriamine, and triethylenetetramine and N-methylaminopropylamine, ethylene diamine, and combinations thereof; and a visible light absorbing dye, wherein the visible light absorbing dye is not reactive towards the polyisocyanate;

wherein the encapsulated visible light absorbing dye dispersion is obtained by a process comprising:

providing the urethane prepolymer;

reacting the urethane prepolymer with a neutralizing agent to form a neutralized prepolymer;

adding the visible light absorbing dye to the neutralized prepolymer;

adding water to the neutralized prepolymer to form an aqueous dispersion of the neutralized prepolymer; and reacting the aqueous dispersion of the neutralized prepolymer with a chain extender thereby producing an encapsulated visible light absorbing dye dispersion.

18. The ink jet ink of claim 17, wherein the encapsulated visible light absorbing dye dispersion has an average particle size of from about 20 nm to about 900 nm, a viscosity of from about 2 to about 150 cps at room temperature, and a surface tension of from about 15 to about 65 dyn at room temperature.

* * * * *